US006937642B2

(12) United States Patent  (10) Patent No.: US 6,937,642 B2
Hirata  (45) Date of Patent: Aug. 30, 2005

(54) CDMA COMMUNICATION SYSTEM AND CHANNEL ESTIMATING METHOD USED IN THE SAME

(75) Inventor: Masaru Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 813 days.

(21) Appl. No.: 09/855,621

(22) Filed: May 16, 2001

(65) Prior Publication Data

US 2001/0043642 A1 Nov. 22, 2001

(30) Foreign Application Priority Data

May 17, 2000 (JP) ........................................ 2000-144235

(51) Int. Cl.⁷ ................................................ H04B 1/69
(52) U.S. Cl. ...................................... 375/144; 375/316
(58) Field of Search ............................. 375/144, 130, 375/147, 316; 370/480, 500, 320, 335, 342; 455/13.4, 134, 76.6, 522, 67.6

(56) References Cited

U.S. PATENT DOCUMENTS 5,771,451 A * 6/1998 Takai et al. ................. 455/442
6,233,454 B1 * 5/2001 Sato ........................... 455/437

FOREIGN PATENT DOCUMENTS

EP      1 133 072 A1   9/2001
JP      10-107768      4/1998
JP      2000-004212    1/2000
WO      WO 98/29965    9/1998
WO      WO 99/39452    8/1999
WO      WO 01/03318 A1 1/2001

OTHER PUBLICATIONS

United Kingdom Search Report dated Dec. 10, 2001.

Japanese Office Action, dated Oct. 22, 2002.

* cited by examiner

*Primary Examiner*—Khai Tran
(74) *Attorney, Agent, or Firm*—McGinn & Gibb, PLLC (57) ABSTRACT

A common pilot channel-use reverse diffusion unit generates common pilot data using a received digital signal and a common pilot channel-use reverse diffusion code, while an individual channel-use reverse diffusion unit generates individual channel data using the received digital signal and an individual channel-use reverse diffusion code. Power calculating unit converts respective output data items of the common pilot channel-use reverse diffusion unit and the individual channel-use reverse diffusion unit into power values, a larger one of which is then determined by a comparator. A selector unit selects the data item having thus determined larger power value of those output data items of those reverse diffusion units. A channel estimating unit estimates the channel using data symbols of the data item thus selected by the selector unit.

9 Claims, 8 Drawing Sheets

CDMA COMMUNICATION SYSTEM AND CHANNEL ESTIMATING METHOD USED IN THE SAME

BACKGROUND OF THE INVENTION

1. Field of the Invention

The present invention relates to a CDMA (Code Division Multiple Access) communication system and a channel estimating method used in the same and, more particularly to, a channel estimating method in a CDMA communication system.

The present application claims priority of Japanese Patent Application No.2000-144235 filed on May 17, 2000, which is hereby incorporated by reference.

2. Description of the Related Art

Recently, a CDMA communication system resistant to interference and disturbance has been attracting the world attention as a communication system used in a mobile communication system. By the CDMA communication system, a user signal to be transmitted is diffused with a diffusion code and transmitted on a transmission side and, when received on a reception side, undergoes reverse diffusion by use of the same diffusion code, thus recovering the original user signal.

Figure 2:
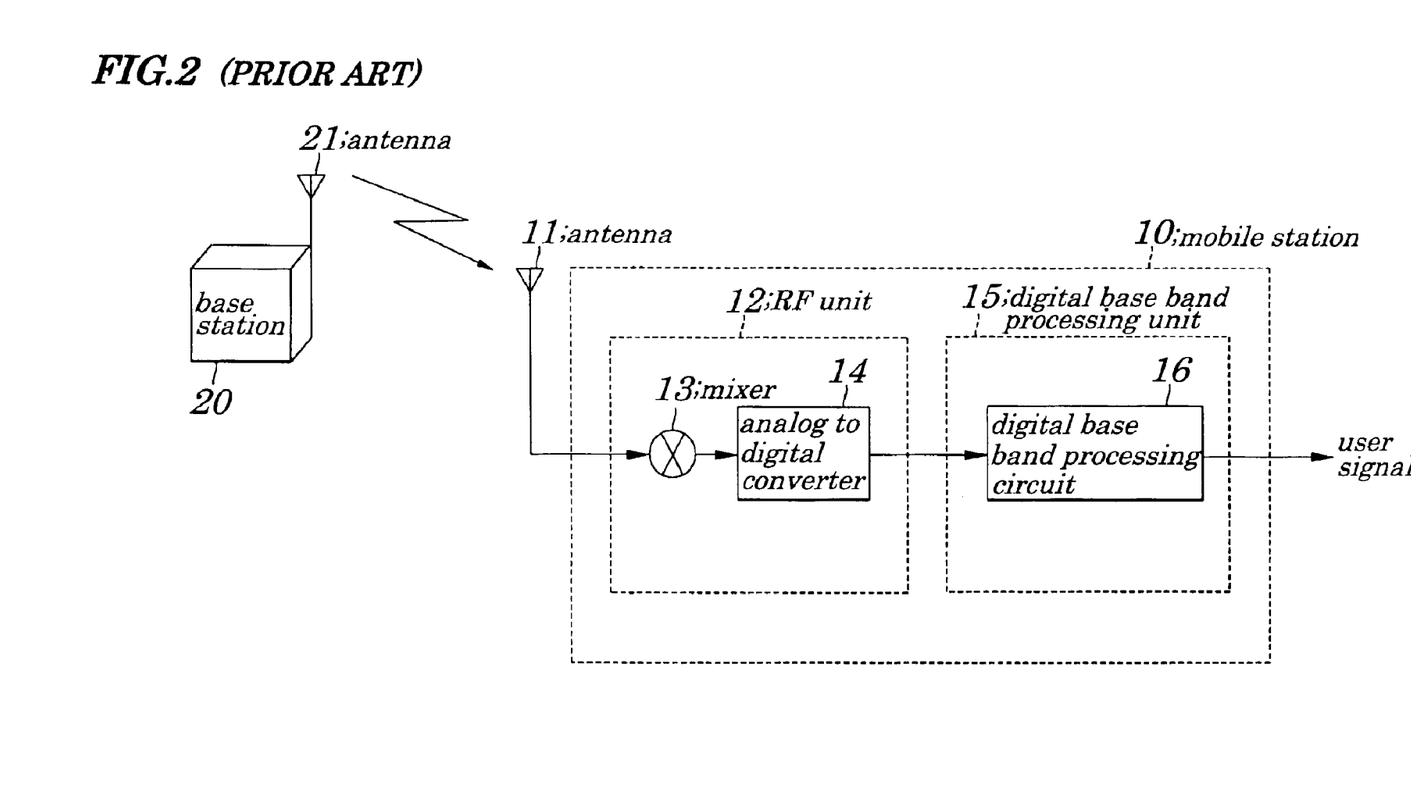
FIG. 2 is a block diagram for showing a configuration of a prior art CDMA communication system.

The following will describe a receiving method in the above-mentioned CDMA communication system with reference to FIG. 2. A base station 20 diffuses a user signal and multiplies thus diffused signal and a LOCAL signal to form a modulated RF signal and then transmits it from an antenna 21.

The radio wave transmitted from the base station 20 passes through a propagation path and arrives at a mobile station 10. The radio wave specifically enters the mobile station 10 through its antenna 11 and then is restored to a base band signal at a mixer 13 of an RF unit 12. The base band signal is converted into a digital signal by an ADC (Analog to Digital Converter) 14 and then restored to the user signal by a digital base band processing circuit 16 of a digital base band processing unit 15.

In this case, however, since the radio wave transmitted from the base station 20 reaches the mobile station 10 as reflected by, for example, a building when passing through the propagation path, at the mobile station 10 the radio wave has a phase changed from that thereof when it was transmitted from the base station 20, so that it cannot be restored as is to its original user signal. To recover a change of this shape change, channel estimation is carried out to thereby restore the original user signal.

Figure 3:
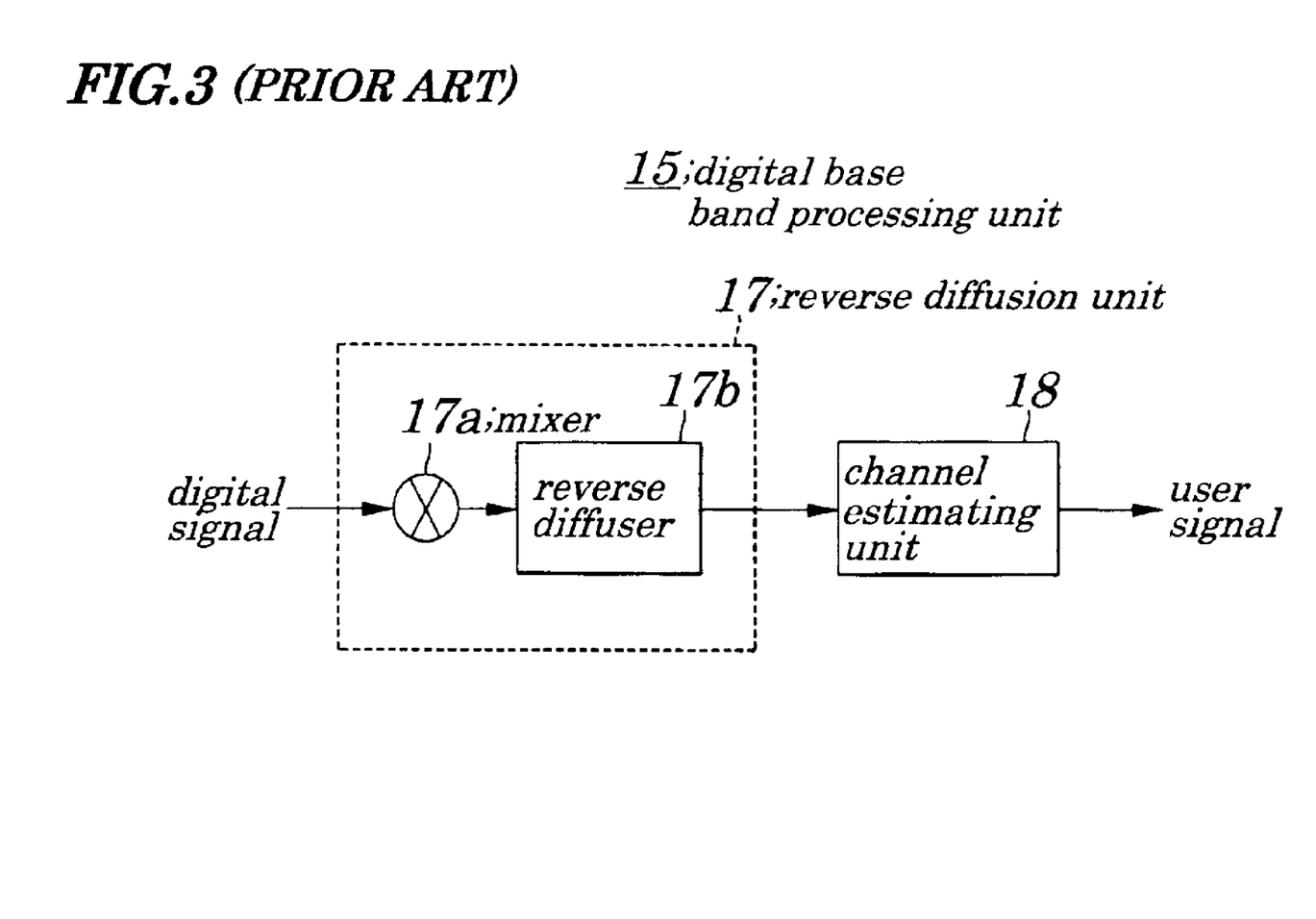
FIG. 3 is a block diagram for showing a configuration of a digital base band processing unit of the prior art CDMA communication system of FIG. 2.

As shown in FIG. 3, the digital base band signal processing unit 15 comprises a reverse diffusion unit 17 including a mixer 17a and a reverse diffuser 17b and a channel estimating unit 18, in such a configuration that a digital signal input to the digital base band signal processing unit 15 is converted by the reverse diffuser 17b into symbol data transmitted at the base station 20 and enters the channel estimating unit 18, where the influence thereof given by the propagation path is measured and then cancelled, to thereby restore the original user signal.

The following will describe this channel estimating method. Data transmitted from the base station 20 to the mobile station 10 comprises data of an individual channel being user data such as speech and data of a common pilot channel, symbols of which are all known.

The individual channel has different data for different users, while the common pilot channel transmits same information to all users. Channel estimation refers to utilizing known data being transmitted from the base station 20 to measure a phase change of data caused by the building or a like, thus restoring the user data.

Figure 4:
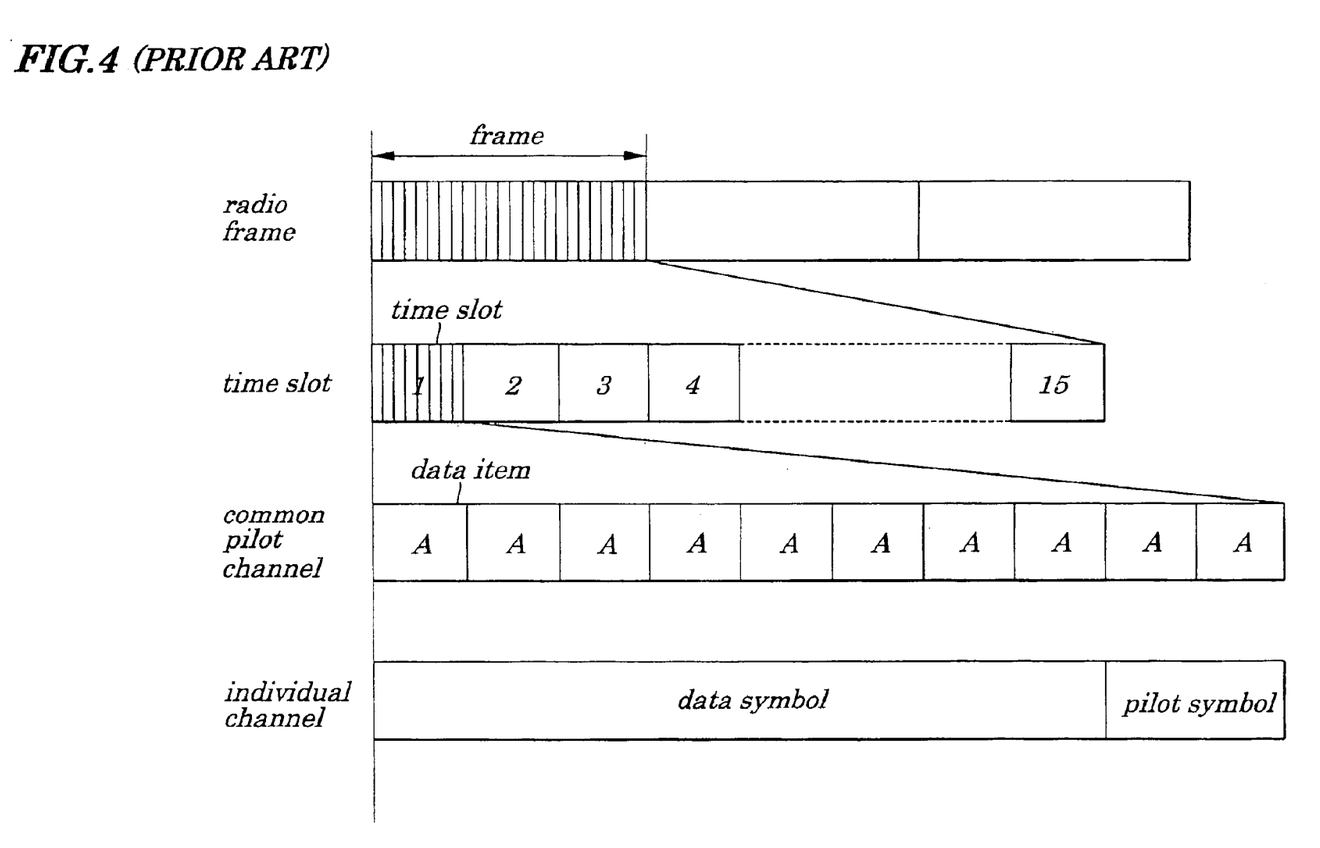
FIG. 4 is an illustration for showing respective slot formats for data of a common pilot channel and data of an individual channel.

Now, slot formats for the individual channel and the common pilot channel are shown in FIG. 4. The base station 20 transmits data for each radio frame (10 ms), which consists of 15 time slots (time slots 1–15) as shown in FIG. 4.

Also, the common pilot channel and the individual channel are transmitted simultaneously, which common pilot channel has 10 data items (A) in one time slot, which are all known. The individual channel has, for example, 20 data items in one time slot, 16 data items of which are data symbols such as speech and four data items of which are pilot symbols. Those four pilot symbols are different with different slots, with their pilot symbol pattern being known.

Figure 5:
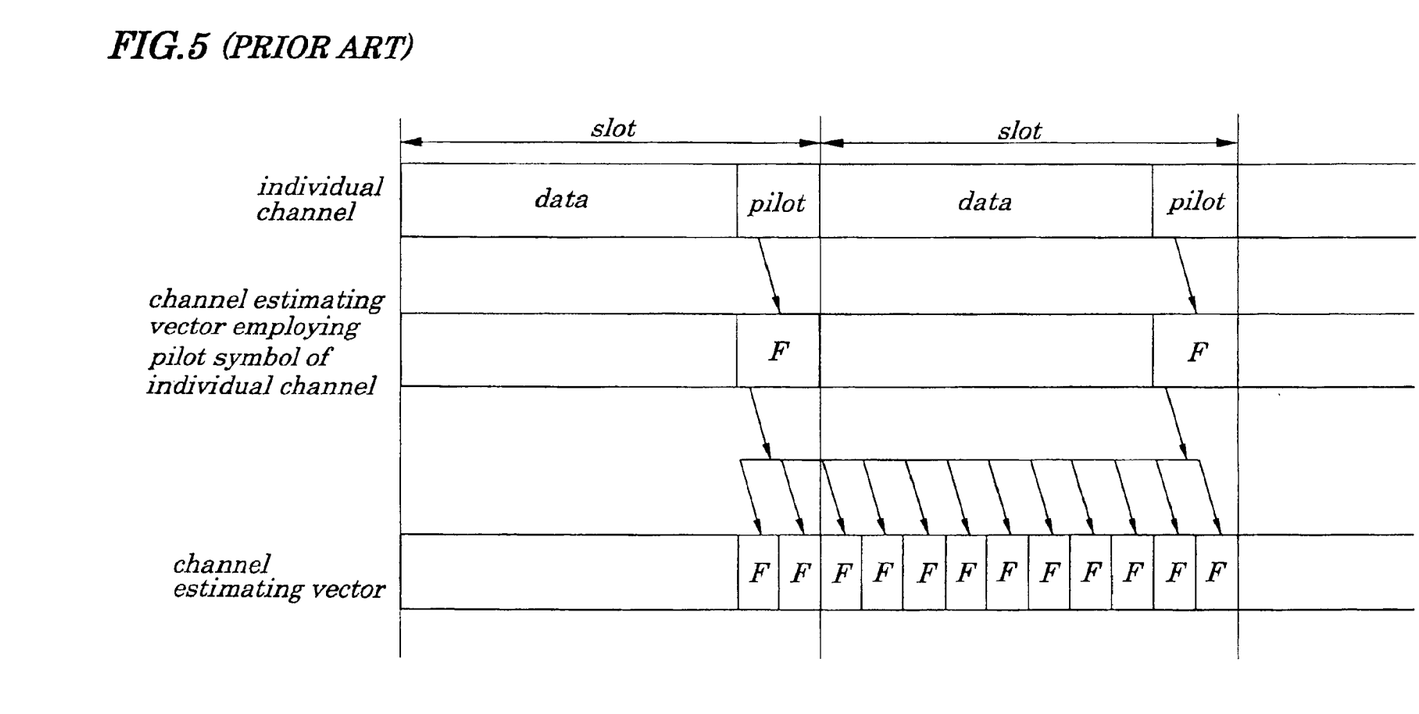
FIG. 5 is an illustration for showing a channel estimating method by use of a pilot symbol of the individual channel data.

Channel estimation by use of an individual channel is described with reference to FIG. 5. When the mobile station 10 receives an individual channel, its pilot symbol is used to estimate a channel because only the pilot symbol is known of each individual channel.

Since, however, the pilot symbol is given only four in one slot, the pilot symbols before and behind the relevant data must be used to know a phase change in the data symbol of an individual channel. To estimate the channel by thus using the preceding and following pilot symbols, a phase change in one slot must be interpolated using these pilot symbols, thus complicating the processing.

Figure 6:
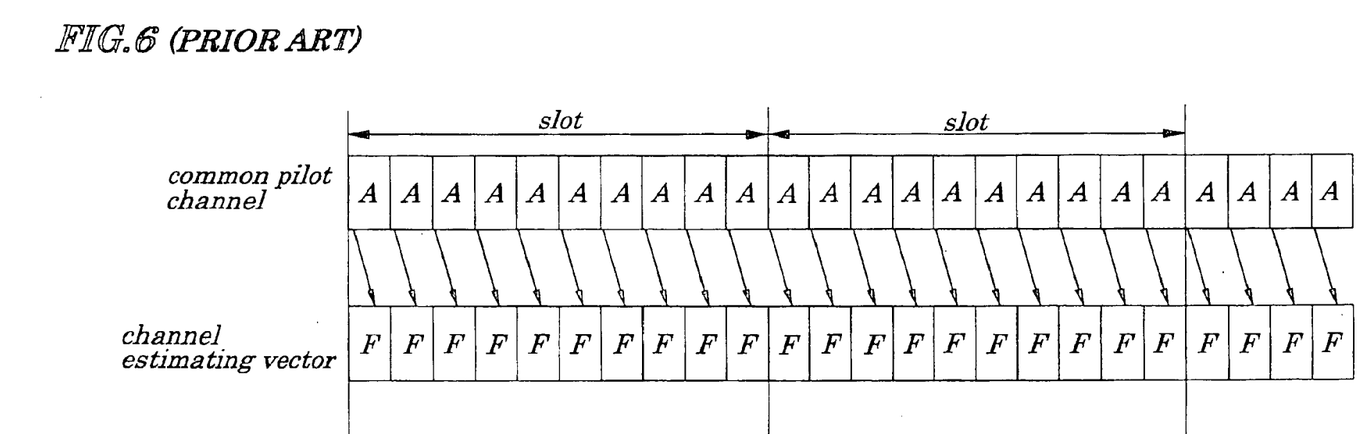
FIG. 6 is an illustration for showing a channel estimating method by use of data of a common pilot channel.

The following will describe channel estimation by use of a common pilot channel with reference to FIG. 6. Since the data items of common pilot channels are all known, a mobile station 10 can know a change in phase of the data of a common pilot channel it received which change is caused by an influence of the building or the like, by comparing that data with a known common pilot pattern.

Also, since the symbol data items of common pilot channels are all known, a phase change in each data symbol of an individual channel can be measured without being interpolated in one slot, thus simplifying the processing.

Figure 7:
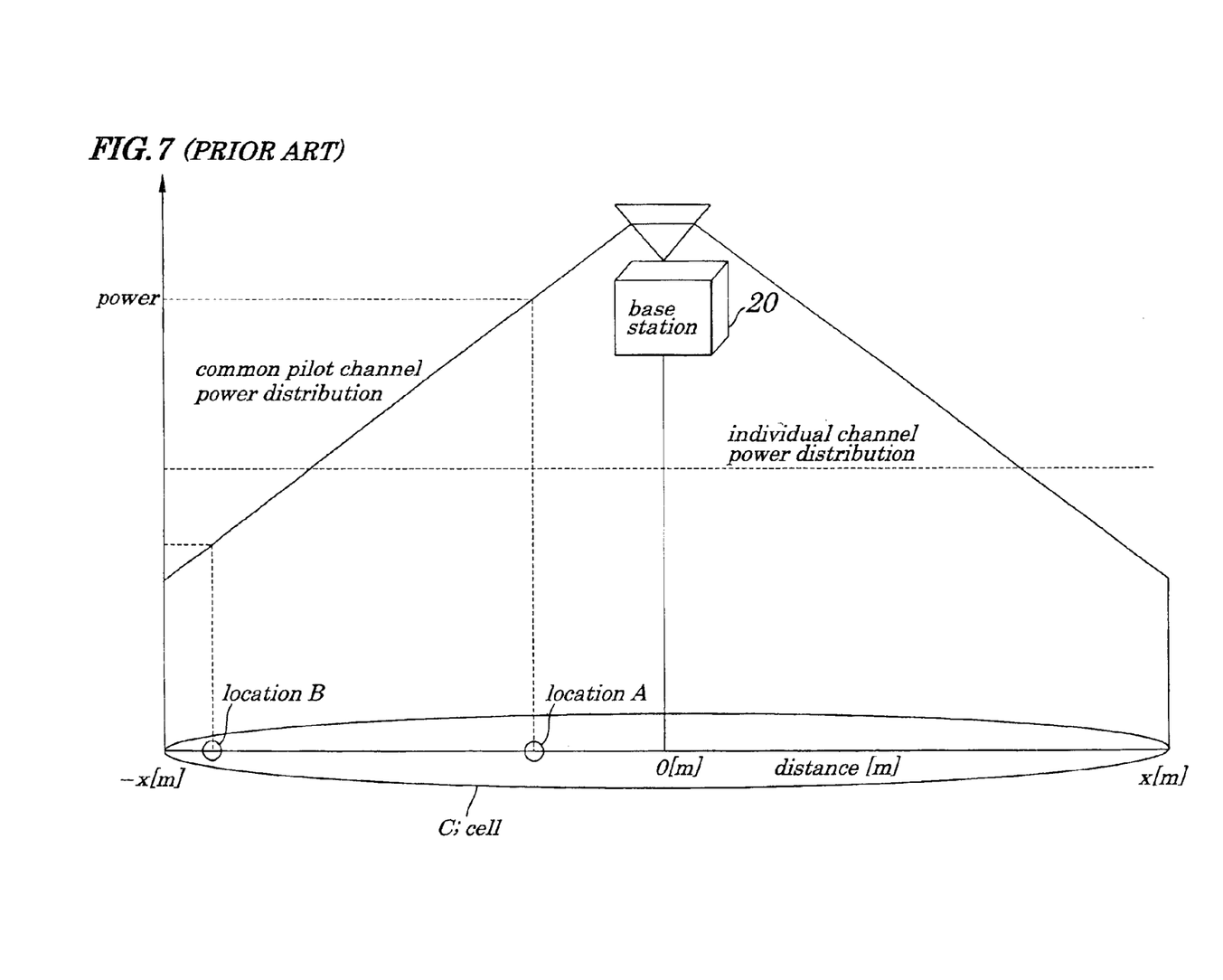
FIG. 7 is a conceptual diagram for showing powers of a common pilot channel and an individual channel being transmitted by a base station.

The following will describe a transmission power for a common pilot channel and an individual channel transmitted by the base station 20 with reference to FIG. 7. The common pilot channel is provided to transmit common information to all the users and so its transmission power gradually decreases as the relative distance of the mobile station 10 with respect to the base station 20 increases, whereas the individual channel is provided to transmit different information to the different users and so the base station 20 controls the transmission power so that the information may be received with the same transmission power level no matter where the mobile station 10 is positioned with respect to the base station 20.

In FIG. 7, if the mobile station 10 moves, for example, from a location A to a location B in a cell C, the power for transmission to the mobile station 10 gradually decreases because the mobile station 10 goes farther away from the base station 20 as it goes toward the location B. However, the same transmission power can be maintained in reception of an individual channel even if the mobile station 10 moves from the location A to the location B.

The above-mentioned prior art channel estimating method suffers from a problem that the reception quality differs with different respective distances between the base station 20 and the mobile station 10 during channel estimation by use of the common pilot channel data.

Besides, although the reception quality is maintained at a constant level irrespective of the respective distance between the base station 20 and the mobile station 10 when a channel is estimated using the individual channel data, a phase change in one slot needs to be interpolated with a pilot symbol, thus problematically complicating the processing.

Figure 8:
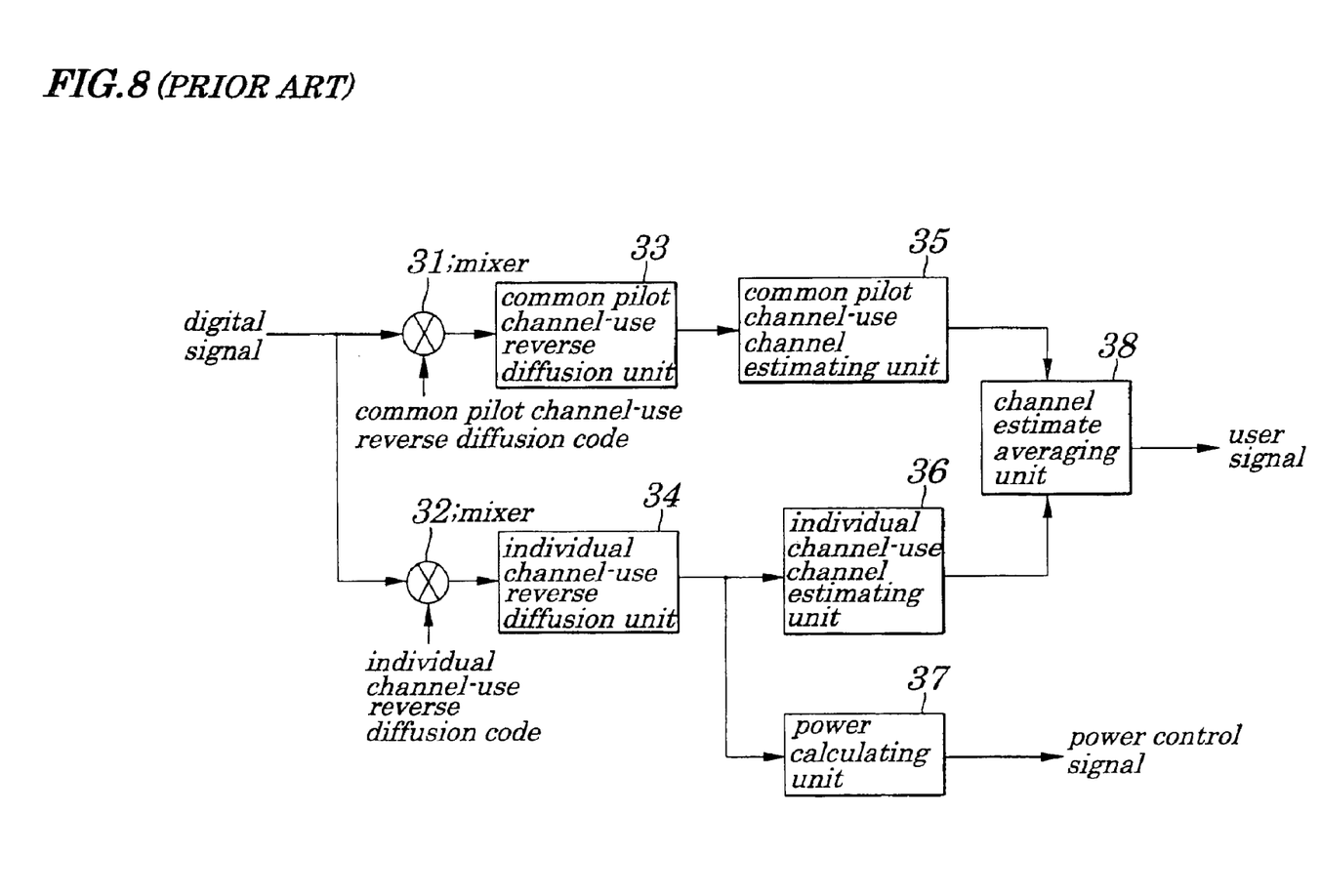
FIG. 8 is a block diagram for showing another configuration of the digital base band processing unit of the prior art CDMA communication system.

Further, as shown in FIG. 8, when a channel is estimated for both a common pilot channel and an individual channel using mixers 31 and 32, a common pilot channel-use reverse diffusion unit 33, an individual channel-use reverse diffusion unit 34, a common pilot channel-use channel estimating unit 35, and an individual channel-use channel estimating unit 36, the respective channel estimate results must be averaged at a channel estimate averaging unit 38 to thereby restore user data, thus problematically complicating the processing and increasing the current dissipation. A reference numeral 37 in FIG. 8 indicates a power calculating unit.

SUMMARY OF THE INVENTION

In view of the above, it is an object of the present invention to provide a CDMA communication system and a channel estimating method used in the same that can solve the above-mentioned problems to thereby obtain at least the same reception characteristics irrespective of location and to reduce current dissipation.

According to a first aspect of the present invention, there is provided a CDMA communication system in which a base station transmits data in which an individual channel being individual user data and a common pilot channel in which all symbols that are known are mixed to a mobile station so that the mobile station may use at least one of the individual channel and the common pilot channel to thereby carry out channel estimation in order to restore a phase change in data transmitted from the base station;

wherein the mobile station comprising a first means for carrying out the channel estimation using the common pilot channel, when the mobile station is near the base station and, if the mobile station is far away from the base station, for carrying out the channel estimation using a pilot symbol of the individual channel.

In the foregoing first aspect, a preferable mode is one that wherein further including a second means for comparing respective power values of post-reverse diffusion data items of the common pilot channel and the individual channel so that either one of the post-reverse diffusion data items of the common pilot channel and the individual channel that has a larger one of the power values may be used to carry out the channel estimation.

Also, another preferable mode is one that wherein further including:

A third means for generating common pilot data using a received signal and a common pilot channel-use reverse diffusion code;

A fourth means for generating individual channel data using the received signal and an individual channel-use reverse diffusion code; and A fifth means for converting the common pilot data and the individual channel data into respective power values, wherein the power values thus converted are compared with each other to thereby determine the data having either one of the power values which is larger than the other.

More specifically, the CDMA communication system of the above first aspect includes a common pilot channel-use reverse diffusion unit for generating common pilot data using a common pilot channel-use reverse diffusion code and a signal in which common pilot channel data and individual channel data are mixed at a rate of a digital signal input to the digital base band processing unit, that is, a rate (chip rate) of a signal diffused at the base station, an individual channel-use reverse diffusion unit for generating individual channel data using that digital signal and an individual channel-use reverse diffusion code, a power calculating unit for calculating power values of the output data of these respective reverse diffusion units, a comparator for determining, by comparison, a larger one of thus obtained power values, a selector unit for selecting either one of the common pilot data and the individual channel data of the larger power determined by the comparison, and a channel estimating unit for estimating a channel using the data symbols of the data selected by the selector unit.

According to a second aspect of the present, there is provided a channel estimating method for a CDMA communication system by which a base station transmits data in which an individual channel being individual user data and a common pilot channel in which all symbols that are known are mixed to a mobile station so that the mobile station may use at least one of the individual channel and the common pilot channel to thereby carry out channel estimation in order to restore a phase change in data transmitted from the base station, wherein the mobile station carries out the channel estimation using the common pilot channel when the mobile station is near the base station and, if the mobile station is far away from the base station, carries out the channel estimation using a pilot symbol of the individual channel.

In the foregoing second aspect, a preferable mode is one wherein respective power values of post-reverse diffusion data items of the common pilot channel and the individual channel are compared with each other so that either one of the post-reverse diffusion data items of the common pilot channel and the individual channel that has a larger one of the power values may be used to thereby carry out the channel estimation.

Another preferable mode is one that wherein including the steps of:

generating common pilot data using a received signal and a common pilot channel-use reverse diffusion code;

generating individual channel data using the received signal and an individual channel-use reverse diffusion code;

converting the common pilot data and the individual channel data into respective power values; and comparing the power values thus converted with each other to thereby determine either one of the common pilot data and the individual channel data that has a larger one of the power values.

With the above configurations, a mobile station estimates a channel using the data of a common pilot channel when it is near the base station and, if it is far away from the base station, using the pilot symbols of the data of an individual channel in estimation, thus enabling obtaining at least the same reception characteristics no matter where it is positioned. Also, the current dissipation can be reduced because it is not necessary to average the estimate results of the common pilot channel and the individual channel.

BRIEF DESCRIPTION OF THE DRAWINGS

The above and other objects, advantages, and features of the invention will be more apparent from the following description taken in conjunction with the accompanying drawings, in which.

DESCRIPTION OF THE PREFERRED EMBODIMENT

Best modes of carrying out the present invention will be described in further detail using a preferable embodiment with reference to the accompanying drawings.

EMBODIMENT

Figure 1:
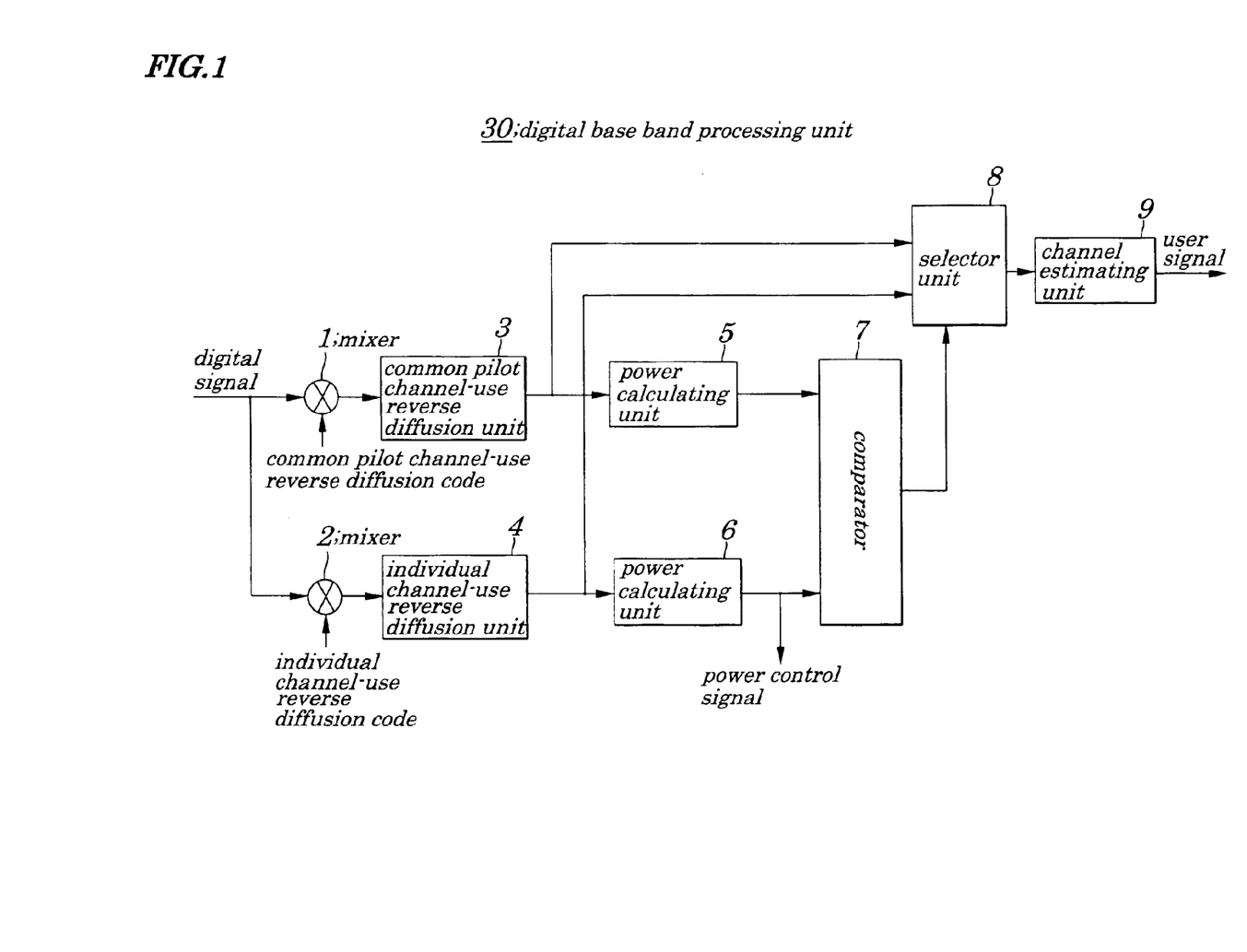
FIG. 1 is a block diagram for showing a configuration of a digital base band processing unit of a CDMA communication system according to one embodiment of the present invention.

In FIG. 1, a digital base band processing unit 30 of a CDMA communication system according to an embodiment of the present invention comprises mixers 1 and 2, a common pilot channel-use reverse diffusion unit 3, an individual channel-use reverse diffusion unit 4, power calculating units 5 and 6, a comparator 7, a selector unit 8, and a channel estimating unit 9.

A digital signal input to the digital base band processing unit 30 consists of data in which data of a common pilot channel and data of an individual channel are mixed at a signal rate (chip rate) at which diffusion is conducted at the base station (not shown).

The common pilot channel-use reverse diffusion unit 3 generates and outputs common pilot data using a digital signal having a received chip rate and a common pilot channel-use reverse diffusion code added by the mixer 1. The individual channel-use reverse diffusion unit 4 generates and outputs individual channel data using the digital signal having the received chip rate and an individual channel-use reverse diffusion code.

The power calculating unit 5 converts output data of the common pilot channel-use reverse diffusion unit 3 into a power value, while the power calculating unit 6 converts output data of the individual channel-use reverse diffusion unit 4 into a power value. The comparator 7 determines a larger one of the power values converted by the power calculating units 5 and 6.

The selector unit 8 selects, based on the comparison results from the comparator 7, and outputs one data item having a larger power value of the two output data items of the common pilot channel-use reverse diffusion unit 3 and the individual channel-use reverse diffusion unit 4. The channel estimating unit 9 estimates a channel using a data symbol of the data item selected by the selector unit 8. Here, the channel estimating unit 9 estimates the channel in a manner similar to that mentioned of the prior art.

By thus comparing the power values of the post-reverse diffusion common pilot channel data and individual channel data to thereby use either one of the channels that has a larger power value in channel estimation, it is not necessary to use both of the common pilot channel and the individual channel, thus simplifying processing and avoiding deterioration of reception quality. Accordingly, it is possible to simplify processing and reduce current dissipation without deteriorating reception quality.

In this embodiment, the common pilot channel is used for transmitting common information to all users, so that the transmission power gradually decreases as a mobile station goes farther away from the base station (not shown), whereas the individual channel is used for transmitting different information to different users so the base station controls the transmission power so that the same power level can be received no matter where the mobile station (not shown) is positioned.

The mobile station can thus use a common pilot channel in channel estimation when it is near the base station and, if it is far away from the base station, uses a pilot symbol of an individual channel to estimate the channel, to thereby obtain at least the same reception characteristics no matter where it is positioned, thus eliminating a need of averaging channel estimate results of the common pilot channel and the individual channel to thereby reduce the current dissipation.

It is apparent that the present invention is not limited to the above embodiment but may be changed and modified without departing from the scope and spirit of the invention.

What is claimed is:

1. A code division multiple access communication system in which a base station transmits data in which an individual channel comprising individual user data and a common pilot channel in which all symbols that are known are mixed to a mobile station so that said mobile station uses at least one of said individual channel and said common pilot channel to thereby carry out channel estimation in order to restore a phase change in data transmitted from said base station, wherein said mobile station comprises:
means for judging a relative position of said mobile station; and
a first means for carrying out said channel estimation using said common pilot channel, when said mobile station is near said base station as judged by said judging means and, if said mobile station is far away from said base station as judged by said judging means, for carrying out said channel estimation using a pilot symbol of said individual channel.

2. The code division multiple access communication system according to claim 1, further comprising a second means for comparing respective power values of post-reverse diffusion data items of said common pilot channel and said individual channel so that either one of said post-reverse diffusion data items of said common pilot channel and said individual channel that has a larger one of said power values is used to carry out said channel estimation.

3. The code division multiple access communication system according to claim 2, further comprising:
a third means for generating common pilot data using a received signal and a common pilot channel-use reverse diffusion code;

a fourth means for generating individual channel data using said received signal and an individual channel-use reverse diffusion code; and a fifth means for converting said common pilot data and said individual channel data into respective power values, wherein said power values thus converted are compared with each other to thereby determine said data having either one of said power values which is larger than the other.

4. A channel estimating method for a code division multiple access communication system comprising:

transmitting, by a base station, data in which an individual channel comprising individual user data and a common pilot channel in which all symbols that are known are mixed to a mobile station, using, by said mobile station, at least one of said individual channel and said common pilot channel to thereby carry out channel estimation in order to restore a phase change in data transmitted from said base station, carrying out, by said mobile station, carries out said channel estimation using said common pilot channel when said mobile station is judged to be near said base station and, if said mobile station is judged to be far away from said base station, carrying out said channel estimation using a pilot symbol of said individual channel.

5. The channel estimating method according to claim 4, further comprising:

comparing respective power values of post-reverse diffusion data items of said common pilot channel and said individual channel with each other so that either one of said post-reverse diffusion data items of said common pilot channel and said individual channel that has a larger one of said power values is used to thereby carry out said channel estimation.

6. The channel estimating method according to claim 5, further comprising:

generating common pilot data using a received signal and a common pilot channel-use reverse diffusion code;

generating individual channel data using said received signal and an individual channel-use reverse diffusion code;

converting said common pilot data and said individual channel data into respective power values; and comparing said power values thus converted with each other to thereby determine either one of said common pilot data and said individual channel data that has a larger one of said power values.

7. A code division multiple access communication system in which a base station transmits data in which an individual channel comprising individual user data and a common pilot channel in which all symbols that are known are mixed to a mobile station so that said mobile station uses at least one of said individual channel and said common pilot channel to thereby carry out channel estimation in order to restore a phase change in data transmitted from said base station, wherein said mobile station comprises:

a judging unit that judges a relative position of said mobile station; and a first unit that carries out said channel estimation using said common pilot channel, when said mobile station is near said base station as judged by said judging unit and, if said mobile station is far away from said base station as judged by said judging unit, for carrying out said channel estimation using a pilot symbol of said individual channel.

8. The code division multiple access communication system according to claim 7, further comprising a second unit that compares respective power values of post-reverse diffusion data items of said common pilot channel and said individual channel so that either one of said post-reverse diffusion data items of said common pilot channel and said individual channel that has a larger one of said power values is used to carry out said channel estimation.

9. The code division multiple access communication system according to claim 8, further comprising:

a third unit that generates common pilot data using a received signal and a common pilot channel-use reverse diffusion code;

a fourth unit that generates individual channel data using said received signal and an individual channel-use reverse diffusion code; and a fifth unit that converts said common pilot data and said individual channel data into respective power values, wherein said power values thus converted are compared with each other to thereby determine said data having either one of said power values which is larger than the other.

* * * * *